US007920521B2

(12) United States Patent
Xiang et al.

(10) Patent No.: US 7,920,521 B2
(45) Date of Patent: Apr. 5, 2011

(54) METHOD AND SYSTEM FOR FOREIGN AGENT RELOCATION IN WIRELESS NETWORK

(75) Inventors: Zhixian Xiang, San Diego, CA (US); Phillip Barber, McKinney, TX (US)

(73) Assignee: FutureWei Technologies, Inc., Plano, TX (US)

( * ) Notice: Subject to any disclaimer, the term of this patent is extended or adjusted under 35 U.S.C. 154(b) by 851 days.

(21) Appl. No.: 11/846,523

(22) Filed: Aug. 28, 2007

(65) Prior Publication Data

US 2008/0084842 A1    Apr. 10, 2008

Related U.S. Application Data

(60) Provisional application No. 60/844,611, filed on Sep. 13, 2006.

(51) Int. Cl.
*H04W 4/00* (2009.01)
(52) U.S. Cl. .......................... 370/331; 455/433
(58) Field of Classification Search .................. 370/329, 370/331; 455/433, 436
See application file for complete search history.

(56) References Cited

U.S. PATENT DOCUMENTS

| | | | |
|---|---|---|---|
| 6,769,000 B1 | 7/2004 | Akhtar et al. | |
| 7,079,499 B1 | 7/2006 | Akhtar et al. | |
| 7,558,844 B1 | 7/2009 | Heidelberger et al. | |
| 7,633,904 B2 * | 12/2009 | Venkatachalam | 370/331 |
| 7,756,468 B2 * | 7/2010 | Kojima | 455/7 |
| 2002/0082012 A1 * | 6/2002 | Wang et al. | 455/435 |
| 2002/0164983 A1 | 11/2002 | Raviv et al. | |
| 2004/0002337 A1 * | 1/2004 | Wheeler et al. | 455/445 |
| 2006/0099973 A1 | 5/2006 | Nair et al. | |
| 2007/0189201 A1 * | 8/2007 | Feder et al. | 370/328 |
| 2008/0082642 A1 | 4/2008 | Wu | |
| 2008/0084842 A1 | 4/2008 | Xiang et al. | |

OTHER PUBLICATIONS

"WiMAX End-to-End Network Systems Architecture (Stage 2: Architecture Tenets, Reference Model and Reference Points)," Aug. 1, 2005, 241 pages, WiMAX FORUM NWG.
Non-Final Office Action for U.S. Appl. No. 11/508,014 to Xiang dated Nov. 25, 2009, 14 pages.
"WiMAX Forum Network Architecture," Stage 3: Detailed Protocols and Procedures, Release 1.1.1, Sep. 14, 2007, 536 pages.
IEEE Standard 802.16e, "Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Computer Society and the IEEE Microwave Theory and Techniques Society, Feb. 28, 2006, 864 pages.

* cited by examiner

*Primary Examiner* — Brian D Nguyen
(74) *Attorney, Agent, or Firm* — Slater & Matsil, L.L.P.

(57) ABSTRACT

Method and system for foreign agent relocation in wireless network. According to an embodiment, the present invention provides a system for providing wireless access. The system includes a service network that include a database for storing information associated with providing network connection. The system also includes a first access network that is configured to provide a first wireless access in a first location. The system further includes a mobile station that is associated with the first access network, the mobile station being configured to send location update messages in an idle mode. The method also includes a second access network that is configured to provide access for the mobile station. The second access network is configured to provide a second wireless access in a second location. The system also includes a third access network that is configured to receive a first location update message from the mobile station in the idle mode.

34 Claims, 4 Drawing Sheets

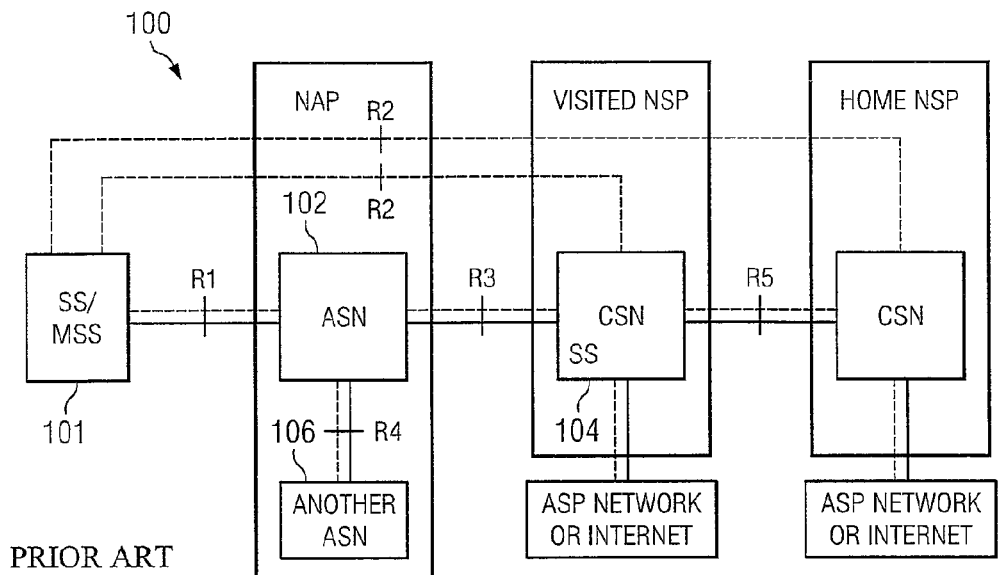
PRIOR ART
FIG. 1
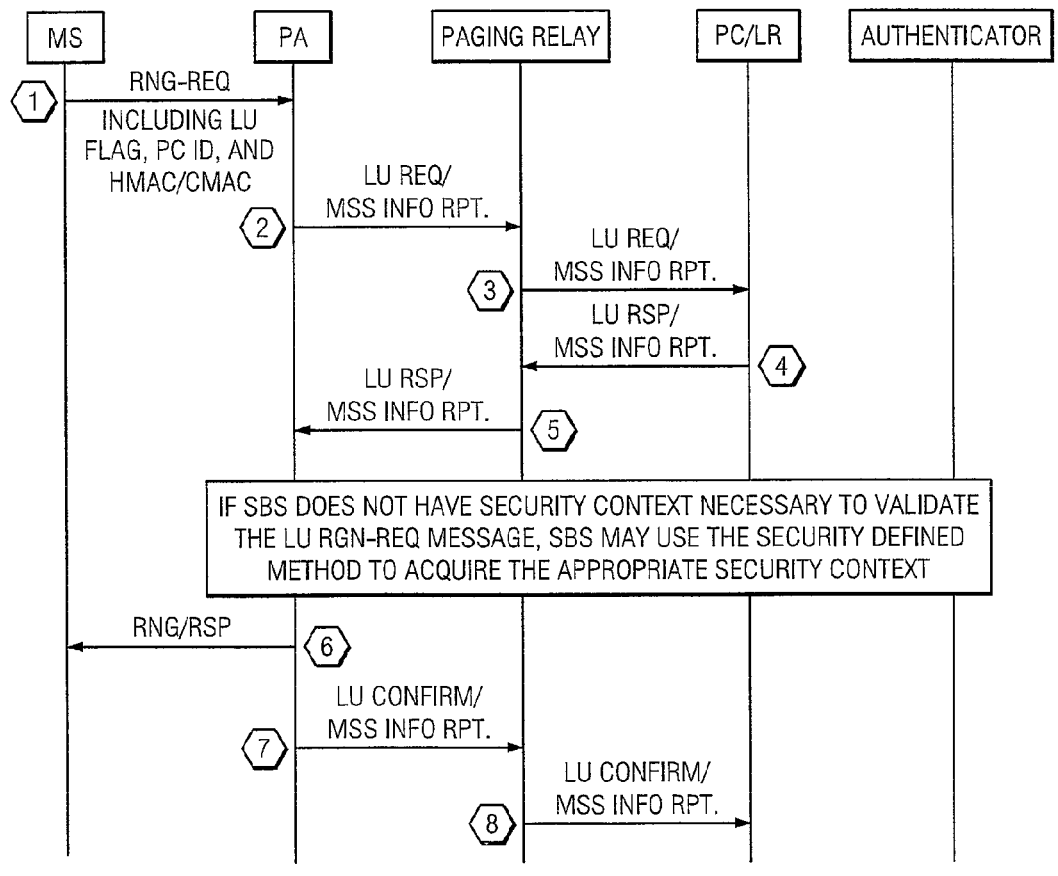
PRIOR ART    FIG. 2

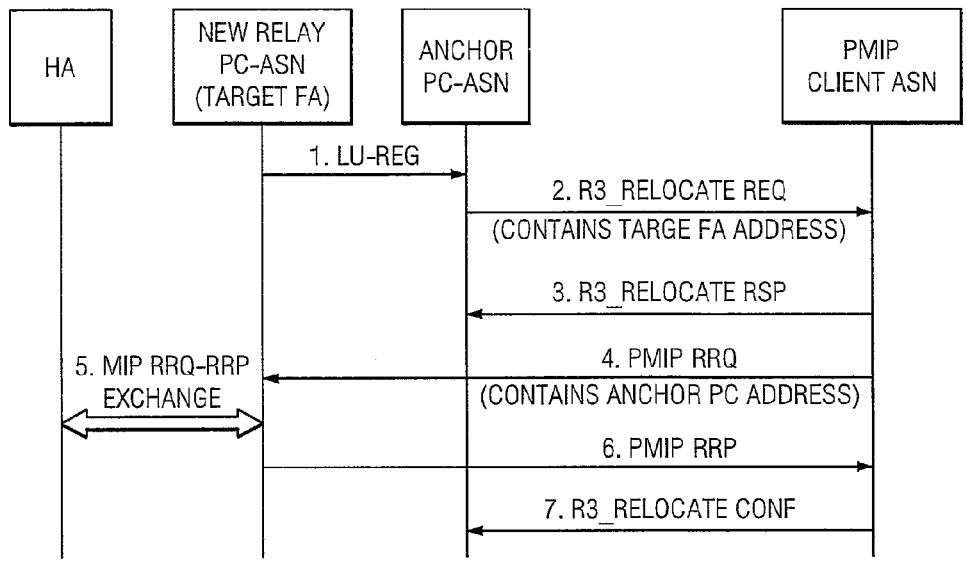
PRIOR ART        *FIG. 3*
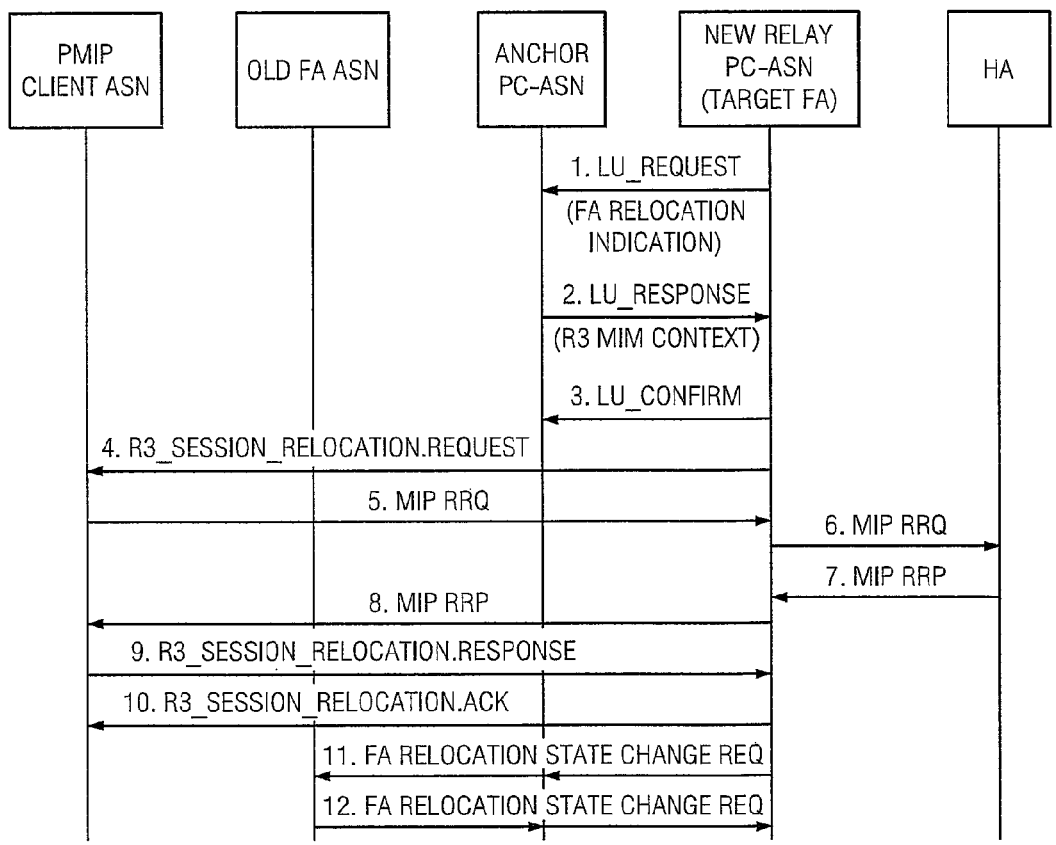
*FIG. 4*

METHOD AND SYSTEM FOR FOREIGN AGENT RELOCATION IN WIRELESS NETWORK

CROSS-REFERENCES TO RELATED APPLICATIONS

This patent application claims the benefit of priority from U.S. provisional application No. 60/844,611, filed on Sep. 13, 2006, which is incorporated by reference herein.

BACKGROUND OF THE INVENTION

The present invention relates in general to telecommunication techniques. More particularly, the invention provides a method and system for foreign agent relocation. In a specific embodiment, the present invention provides a method and system for foreign agents in a network to receive location update signal from mobile stations and perform relocation. Merely by way of example, the invention is described as it applies to WiMAX wireless communication network, but it should be recognized that the invention has a broader range of applicability.

Techniques for wireless communications have progressed through the years. For example, satellite wireless communication networks have been developed where satellites are use to relay voice communication among wireless. There are other techniques as well. Over the recent years, the "cellular" wireless communication networks have become one of the most widely used technique for providing wireless communication.

A wireless network usually includes base stations and mobile stations. For example, a mobile station (MS) refers to a station that is to be used while in motion or during halts at unspecified geographic locations. As an example, the mobile station is a mobile communication device. In another example, the mobile station is a cellular phone. It is understood that the term mobile station is broad define, and may also includes wireless IP devices. A base station (BS) refers to a set of equipment that can provide connectivity, management, and control for one or more mobile stations. Typically, a BS functions as a paging agent (PA). For example, a paging agent refers to a functional entity that handles the interaction between PC and IEEE 802.16e specified Paging related functionality implemented in the Base Station.

As merely an example, a connective service network refers to a set of network functions that provide IP connectivity services to mobile stations. In an exemplary process flow, a MS obtains radio access from a BS. Through the BS, the MS obtains IP services.

In a telecommunication network, a mobile station is typically connected to a local network, which provides, among other things, radio connectivity. The local network also establishes a connection between the mobile station and a network where a variety of services (e.g., routing, Internet protocol routing, etc.) are provided. FIG. 1 is a simplified diagram illustrating a conventional telecommunication network. As an example, the conventional telecommunication network 100 as illustrated in FIG. 1 complies with WiMAX wireless (i.e., IEEE802.16d/e) networks.

In the, a mobile station 101, which is sometimes referred to as mobile subscriber station when the mobile station is subscribed to a specific network service provider, is connected to an access service network. For example, the mobile station 101 is connected to the access service network (ASN) 102. For example, the ASN 102 is configured to provide radio access to the mobile station 101.

In general, the ASNs that participate in HO process can be classified into four types:
a. Serving ASN that hosts Serving HO Function and serves the MS prior to HO.
b. Target ASN that hosts Target HO Function. There might be one or more Target ASNs. One of them is selected as the final HO Target and becomes Serving ASN after HO completion.
c. Anchor ASN that hosts the Anchor DP Function for the MS.
d. Authenticator ASN that hosts Authenticator/Key Distributor Function for the MS.

As an example, the ASN 102 includes a base station (BS) for providing radio access. For example, the BS refers to a generalized equipment set for providing connectivity, management, and control of mobile stations. In addition, the ASN 102 includes a gateway for interfacing with other networks. For example, the gateway allows the mobile station 101 to communicate with other ASNs (e.g., ASN 106). As another example, the gateway allows the mobile station 101 to connect to a connectivity service network (CSN) 104. As an example, the connectivity service network refers to a set of network functions that provide, among other things, IP connectivity service to mobile stations. Often, the CSNs also store policies associated with mobile stations.

Typically, a mobile station connects to a CSN that stores the network policies associated with the mobile station through an ASN. As an example, the CSN is often referred as network service provider from a management perspective. Similarly, the ASN is often referred to as network access provider from a management perspective.

In a Worldwide Interoperability for Microwave Access (WiMAX) network, a mobile station roams through different locations and obtains radio access from different ASNs. For example, a mobile station is initially connected to the WiMAX network through a home agent (HA). The HA typically stored identification and connectivity information for the mobile station. When mobile station moves to a different location, the mobile station obtains radio access from a new access network, which is typically referred as a foreign agent (FA), that is different from the home agent. As an example, a home agent refers to a router on a mobile station's home network, which tunnels datagrams for delivery to the mobile station when the mobile station is not connected to the home agent. In addition, a home station typically maintains current location information for the mobile station. Merely by way of an example, a foreign station refers to a router on a mobile station's visited network which provides routing services to the mobile stations when the mobile station is in the serving area of the visited network. Among other things, the foreign agent detunnels and delivers datagrams to the mobile stations that were tunneled by the mobile station's home agent. For datagrams sent from a mobile station, the foreign agent may also serve as a default router for registered mobile stations. For WiMAX wireless communication system, the FA can be a part of anchor data path function.

In a network, a data path (DP) function refers to a control function in the network which manages the data path setup and includes procedures for data packet transmission between two functional entities. An anchor data path function refers to the data path Function at an end of the data path, which anchors the data path is associated with the mobile station across handovers. For example, in WiMAX wireless communication system, the anchor DP function also includes the FA function.

For effective and reliable communication, mobile stations connect to different foreign agents based on the connectivity afforded by respective foreign agents. When a mobile stations moves from one location to another, the mobile station may switch to a different foreign agent even if the mobile station is in an idle mode. For example, the activities of mobile stations is administered by a paging controller. As an example, a paging controller (PC) refers to a functional entity that administers the activity of idle mode MS in the network. In certain networks, a PC is identified by the PC ID (e.g., 6 bytes) in IEEE 802.16e, which could map to the address of a functional entity. In various applications, the PC also includes location update information associated with mobile stations. For example, a PC performs paging updates, which is a procedure used by the network to seek an MS in idle mode in the coverage area of a predefined set of base station(s) identified by a Paging Group (as per IEEE 802.16e specification). In addition, Paging Update refers to procedures to obtain location update or network entry from an MS in idle mode. Paging procedures are implemented using Paging MAC message exchanges between MS and BS, under the control of a higher-layer paging management functions.

When a mobile station in a WiMAX system roam from one location to another, it sends location update message even if it is in the idle mode. In order for network (PC) to know the location of the MS which is in the idle mode, the MS needs to conduct periodically location update procedure to let anchor PC know which ASN currently the MS is roaming into. The following figure illustrates a procedure for location update.

FIG. 2 is a simplified diagram illustrating a conventional location update process. As shown, the process includes the following steps:

1. MS initiates Location Update (LU), or the Location Update is forced by network if the conditions described in IEEE 802.16e specification are met and as a result, the MS sends RNG_REQ. Ranging Purpose Indication is set as described in IEEE 802.16e specification indicating that the MS intends to update its location. PC ID (which points to PC acting as MS's Anchor PC) also need to be present.
2. PA sends LU Request to the Paging Relay (as shown in the FIG. 2). It contains: MS ID, PCID, BSID.
3. Paging Relay sends LU Request to Anchor PC. It contains: MSID, BSID and recommended paging parameters (PGID, Paging cycle, Paging Offset) etc.
4. If the LU-Request is accepted by Anchor PC and the Paging operation is still continuing, at this step .Paging_Annouce to 'Stop Page' may also be sent to the Paging groups defined for the MS. Anchor PC either accepts the recommended paging parameters or assigns new PGID and other paging parameters and sends LU Response message to Paging relay. LU Response includes: MSID, BSID, PGID and paging parameters, Anchor Authenticator ID, PCID, etc.
5. Paging Relay forwards LU Response to PA.
6. BS (where PA resides) determines whether it has a valid AK for the MSID from the indicated Anchor Authenticator. If it does not, the SBS sends AK Request (not shown in the diagram) to the Anchor Authenticator. AK Response (not shown) provides the AK sequence number, as well as the AK for the BS-MS secure association (as specified in 7.20.2 "AK Transfer Protocol")
7. BS (where PA resides) uses AK to verify the integrity of the RNG-REQ received from MS. If the MS's RNG_REQ is successfully verified, the SBS responds to the MS with RNG_RSP with HMAC/CMAC. If the RNG-REQ could not be verified (such as when the Anchor Authenticator could not provide an AK), the BS begins the "Un-secure Location Update" sequence by initiating re-authentication;
8. In the case where RNG_REQ was verified, PA sends LU Confirm to Paging Relay (incl. MSID, BSID, success indication). It indicates location update from MS has been authenticated and the process is successfully completed.
9. Paging Relay forwards LU Confirm to Anchor PC.

Anchor PC receives LU Confirm and finally updates MS location in the LR. In the event this location update was triggered by paging the MS, then the PC/LR initiates the cancel paging procedure (as described above). For example, it may send the Paging Announce message to stop the paging operation within the paging groups.

Over the past, various conventional WiMAX techniques relied on the PC to perform location update for mobile stations and foreign agents. Unfortunately, these conventional techniques are inadequate for various reasons.

Therefore, it is understood that an improved system and method for performing location update is desired.

SUMMARY OF INVENTION

The present invention relates in general to telecommunication techniques. More particularly, the invention provides a method and system for foreign agent relocation. In a specific embodiment, the present invention provides a method and system for foreign agents in a network to receive location update signal from mobile stations and perform relocation. Merely by way of example, the invention is described as it applies to WiMAX wireless communication network, but it should be recognized that the invention has a broader range of applicability.

According to an embodiment, the present invention provides a system for providing wireless access. The system includes a service network that includes a database for storing information associated with providing network connection. The system also includes a first access network that is configured to provide a first wireless access in a first location. The system further includes a mobile station that is associated with the first access network, the mobile station being configured to send location update messages in an idle mode. The method also includes a second access network that is configured to provide access for the mobile station. The second access network is configured to provide a second wireless access in a second location. The system also includes a third access network that is configured to receive a first location update message from the mobile station in the idle mode. The third access network is configured to provide a third wireless access in a third location. The third access network determines whether to serve the mobile station in response to the first location update message. The third access network sends a request for access information of the mobile station if the third access network determines to serve to mobile station. The third access network sends a message indicating that the third access network is serving the mobile station.

According to another embodiment, the present invention provides a method for providing access in a communication network. The method includes providing a first foreign agent that is configured to provide wireless access to mobile stations. The first foreign agent is associated with a first location. The method also includes providing network access to a mobile station by the first foreign agent. The mobile station is associated with a home agent, the mobile station being in an idle state. The method further includes receiving a location update request from the mobile station by a second foreign agent that is associated with a second location. Additionally, the method includes determining whether to provide an IP access to the mobile station by the second foreign agent.

Furthermore, the method includes requesting by the second foreign agent access information for the mobile station from a database. The method also includes sending the access information from the database to the second foreign agent. Furthermore, the method includes receiving the access information for the mobile station by the second foreign agent. The method also includes providing access to the mobile station by the second foreign agent. In addition, the method includes updating the access information by the database. The method further includes sending a signal by the second foreign agent indicating that the second foreign agent is providing access to the mobile station. In addition, the method includes terminating the network access by the first foreign agent if the signal is received by the first foreign agent.

According to yet another embodiment, the present invention provides a method for providing access in a communication network. The method includes providing a first foreign agent that is configured to provide wireless access to mobile stations. For example, the first foreign agent is associated with a first location. The method also includes providing network access to a mobile station by the first foreign agent, the mobile station being associated with a home agent. The mobile station is in an idle state. The method further includes receiving a location update request from the mobile station by a second foreign agent. The second foreign agent is associated with a second location. The method further includes determining whether to provide an IP access to the mobile station by the second foreign agent. The method further includes requesting by the second foreign agent access information for the mobile station from a database. In addition, the method includes receiving the access information for the mobile station by the second foreign agent. Also, the method includes providing access to the mobile station by the second foreign agent, the mobile being in the idle state. The method includes updating the access information by the database. Additionally, the method includes sending a signal by the second foreign agent indicating that the second foreign agent is providing access to the mobile station. The method also includes terminating the network access by the first foreign agent if the signal is received by the first foreign agent. Moreover, the method includes sending data to the mobile station through the second agent.

Many benefits are achieved by way of the present invention over conventional techniques. In certain embodiments, the present invention provides an FA relocation method that alleviates certain problems associated with conventional WIMAX solution discussed above. In some embodiments, the FA relocation is used to make FA relocation and Location update become more independent from one another. According to an embodiment, the old FA can be notified as soon as the MS which this FA managed is leaving to the new FA, so the network resource can be saved and prevent any administration problem if the old FA still keep the wrong information of the MS. Certain embodiments of the invention provide a mechanism for the FA to get sufficient information to initiate FA relocation while MS in idle mode without involving location update procedure. For example, the FA relocation process is initiated by an FA that detects the presence of the mobile station, thereby allocating the relocation process to be performed in a timely manner. Additionally, the method provides a process that is clearer and simpler than conventional techniques. For example, embodiments of the present invention can be implemented in conventional systems by modifying software component, with little or no hardware modification necessary. Depending upon the embodiment, one or more of these benefits may be achieved. There are other advantages as well.

Depending upon embodiment, one or more of these benefits may be achieved. These benefits and various additional objects, features and advantages of the present invention can be fully appreciated with reference to the detailed description and accompanying drawings that follow.

BRIEF DESCRIPTION OF DRAWINGS

FIG. 1 is a simplified diagram illustrating a conventional telecommunication network.

FIG. 2 is a simplified diagram illustrating a conventional location update process.

FIG. 3 is a simplified diagram illustrating a conventional method for mobile station to switch to a different foreign agent.

FIG. 4 is a simplified flow diagram illustrating a method for FA migration for an Idle mode MS in a PMIP enabled ASN according to an embodiment of the present invention.

DETAIL DESCRIPTION OF THE INVENTION

Figure 5:
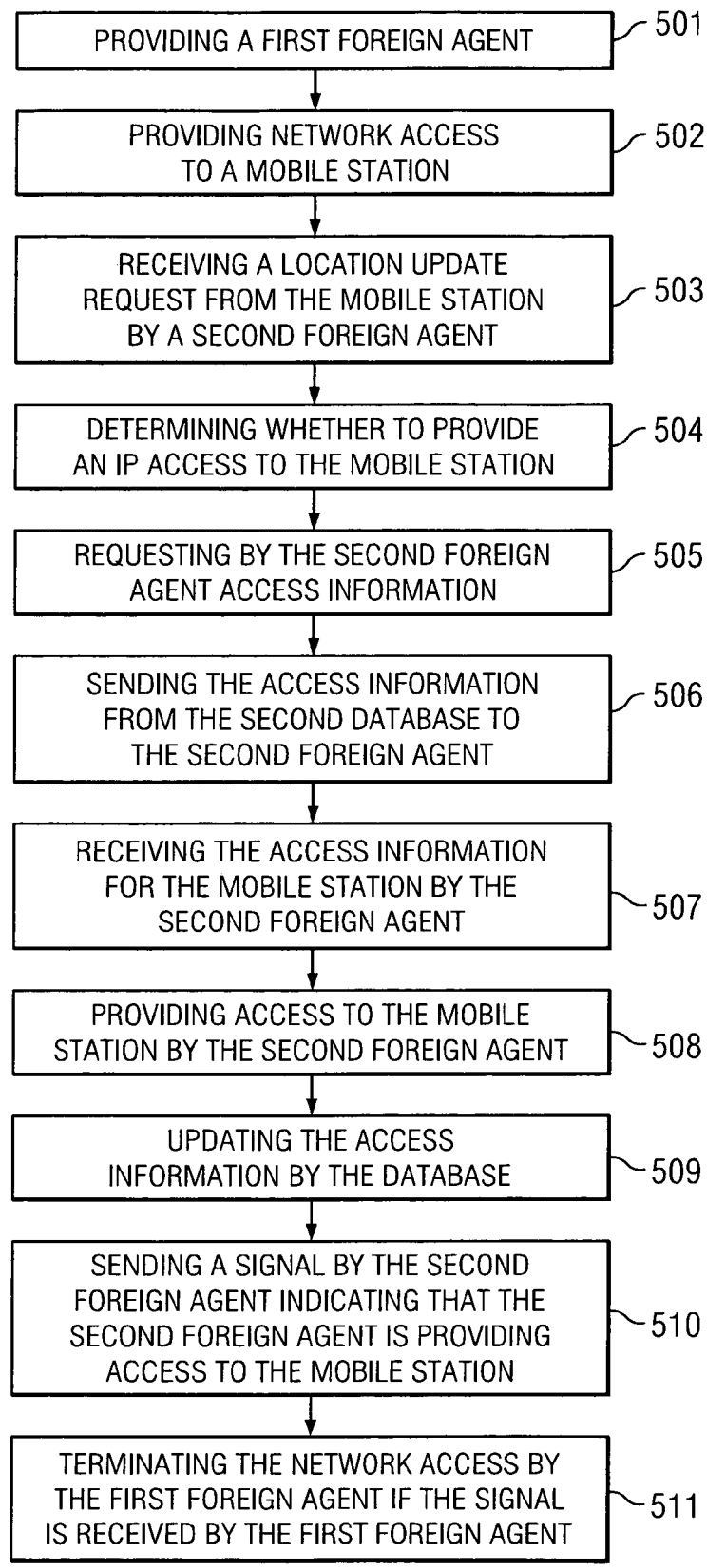
FIG. 5 is a simplified diagram illustrating a process for providing foreign agent relocation according to an embodiment of the present invention.

The present invention relates in general to telecommunication techniques. More particularly, the invention provides a method and system for foreign agent relocation. In a specific embodiment, the present invention provides a method and system for foreign agents in a network to receive location update signal from mobile stations and perform relocation. Merely by way of example, the invention is described as it applies to WiMAX wireless communication network, but it should be recognized that the invention has a broader range of applicability.

As explained above, conventional techniques for updating foreign agent location are often inadequate, and the reasons are discussed below.

In a network system, mobile stations operate in different modes, including the idle mode. The Idle Mode is a mechanism for the MS to become periodically available for DL broadcast traffic messaging without being registered at a specific BS, as the MS often roams and traverses an air link environment that is served by multiple BSs, which is especially true over a large geographic area.

Typically, Idle Mode allows MS to operate more efficiently by removing the active requirement for hand processes. For example, an MS does not have to be in the normal operation mode (e.g., connected to the network for voice or data communication) for switching to different wireless network. Typically, by limiting MS activity to scanning at discrete intervals, Idle Mode allows the MS to conserve power and operational resources. Additionally, Idle Mode benefits the network and BS by providing a simple and timely method for alerting the MS to pending DL traffic directed toward the MS, and by eliminating air interface and network traffic from inactive MS.

In a WiMAX network, each ASN contains an FA entity, which functions as the data interface to the internet (e.g., through the CSN). In order for MS to receive/transmit data as quickly as possible when MS is exiting the idle mode, as well as to provide easy network administration, when an idle MS roams into a new ASN, the FA to which the MS associated with before roaming into the new ASN is switch to the new FA in the new ASN to make the FA to be closer to the MS and easier for network management. The action to change the MS attached FA is often referred to as FA relocation.

FIG. 3 is a simplified diagram illustrating a conventional method for mobile station to switch to a different foreign agent. As shown, the method includes the following steps:

STEP 1: When the anchor-PC receives a LU_req message, it compares the address of the relay PC it received the message from with the address of the last relay-PC that it has stored in its location register for this MS. If the two addresses are the same, then it means that the MS has switched paging groups, but within the same ASN. No action is needed in this case. If the two addresses are different, then step 2 is executed for switching ASN.

STEP 2: The anchor-PC contacts the proxy mobile IP (PMIP) client for the MS (the PMIP client is always collocated with the Authenticator in the same ASN for security reasons; the anchor-PC has the address of the authenticator stored in its location register, from the time the MS went idle). The Anchor-PC-ASN-GW sends an R3_relocate trigger to the PMIP client to start the PMIP handoff. This trigger message contains the address of the target FA that the MS has moved under.

STEP 3: The PMIP client receives the trigger, and sends back an R3_relocate response to the anchor PC.

STEP 4: The PMIP client sends a PMIP-RRQ to the target FA. This message contains the anchor PC address, which needs to be stored by the new target FA for paging the MS, when there are incoming packets for this MS.

STEP 5: This depicts the standard MIP RRP-RRQ exchange as specified in the CSN-MM between the target FA and the HA.

STEP 6: The target FA relays back the RRP to the PMIP client.

STEP 7: PMIP client sends a R3 relocate confirm to the anchor PC.

With the above call flow, the FA for the MS is located in the same ASN as the MS in Idle mode. Unfortunately, the conventional method described above are have the following limitations:

1. The PC functions as a paging database. The FA relocation provides traffic related actions. As a result, it is not desirable for the FA relocation to be controlled or decided by PC from architecture point of view.
2. FA relocation processes can occur almost any time when the MS in idle mode. However, in conventional networks, FA relocation processes tend to be limited to being triggered by LU messages or Location update procedure. Therefore, these two procedures are only loosely linked. However, conventional techniques are used by both
3. FA relocation processes can not occur after the FA has already received location update request which is the beginning of location update process. In a conventional network, FA relocation can not occur until at least after location confirm which indicates that the location update process has completed. As a result, location update is often performed too late.
4. The target FA does not have, or the access to, information related to the PMIP client and old target FA. Therefore, there is no communication mechanism for the relay PC which knows this info to inform the target FA.
5. After the FA relocation is successfully completed, the old FA does not get any indication of the moving MS, so the state and resource associated with the MS can be kept for a long period time which can cause network resource and management problem.

Therefore, it is to be appreciated that according to embodiments of the present invention, location update is performed in an efficient and reliable manner, thereby improving the performance of the wireless network.

According to a specific embodiment, the present invention provides an improved method for FA relocation. For example, the method provides support for migration of FA for an Idle Mode MS in a PMIP-enabled ASN. In an embodiment, the migration of the FA is triggered during idle mode when the MS moves from one ASN location to another. For example, the MS may also switch to a different FA for reasons.

FIG. 4 is a simplified flow diagram illustrating a method for FA migration for an Idle mode MS in a PMIP enabled ASN according to an embodiment of the present invention.

This diagram is merely an example, which should not unduly limit the scope of the claims herein. One of ordinary skill in the art would recognize other variations, modifications, and alternatives. As shown in FIG. 4, the method including the following steps:

STEP 1: during a security location update process, the Relay PC (e.g., the BS thereof) receives a location update request from the MS. The Relay PC sends location update request to ASN GW which contains an FA. In an embodiment, after the GW receives information that the MS is roaming into the network, if it decides to conduct FA relocation after location update is completed, it adds FA relocation indicator and the target FA information into the location update request message and send to the ASN with Anchor PC.

STEP 2: Upon receiving the Location Update request with FA relocation indicator, the anchor PC updates its database for this MS and sends Location Update response with associated information (e.g., R3 MM context) for FA relocation back to the ASN.

STEP 3: The ASN receives the location update response with the FA relocation information and the ASN forward this information to the FA. Next the ASN sends location update confirm (e.g., the LU-confirm message) back to the anchor PC.

STEP 4-10: In a specific embodiment, upon receiving the LU-confirm, the ASN GW that is associated with the target FA promptly initiates the a PMIP mobility process to prevent a race condition. In an embodiment, steps 1-3 omitted. For example, the target FA fetches the information from PC through context-request/response message exchange with anchor PC while it plans to start FA/anchor DP relocation. Upon receiving the context-response with the R3 MM information, ASN initiates the PMIP mobility process.

STEP 11-12: In some embodiments, if FA relocation is successful, the anchor DP function (ASN GW) with the new FA will send FA relocation state change request to the ASN where the anchor PC locates in order for anchor PC to update its anchor DP/FA information. In an embodiment, the anchor PC forwards the FA relocation state change request to the ASN where the replaced FA resides, if the FA relocation is succeeded, since anchor PC has the correct and latest information of the latest FA being replaced by current FA. In a specific embodiment, the old FA can release the resource for the MS, then send FA relocation state change response back to anchor PC and the ASN with new FA through anchor PC.

In an alternative embodiment, if FA relocation is needed when no location update procedure involved, the old and/or new FA send a Context request message with an R3 MM indication to the anchor PC, which in response to fetch the latest information and initiates the FA relocation.

It is to be appreciated that various steps as illustrated in FIG. 4 and as shown may be added, removed, replaced, modified, rearranged, repeated, overlapped, and/or partially overlapped. For example, an embodiment provides a method that uses a combination of steps including a way of making FA migration for an Idle mode MS in a PMIP enabled ASN. Other alternatives can also be provided where steps are added, one or more steps are removed, or one or more steps are provided in a different sequence without departing from the scope of the claims herein.

FIG. 5 is a simplified diagram illustrating a process for providing foreign agent relocation according to an embodiment of the present invention. This diagram is merely an example, which should not unduly limit the scope of the claims. One of ordinary skill in the art would recognize many variations, alternatives, and modifications. For example, various steps may be added, removed, replaced, rearranged, modified, repeated, overlapped, and/or partially overlapped.

At step 501, a first foreign agent is provided. For example, the first foreign agent is configured to provide wireless access to mobile stations. The first foreign agent is associated with a first location.

At step 502, network access to a mobile station is provided by the first foreign agent. The mobile station is associated with a home agent. The detailed description for home agents is provided above. In addition, the mobile station in an idle state.

At step 503, a location update request is received from the mobile station by a second foreign agent. For example, the second foreign agent is associated with a second location. According to embodiments, the mobile station periodically sends location update messages to access networks. For example, the mobile stations moves to a location that is served by the second foreign agent.

At step 504, the second foreign agent determines whether to provide an IP access to the mobile station. Depending on the application, the determination may be based on a variety of factors. For example, the determination may be based on the signal strength, network condition, etc.

At step 505, the second foreign agent send an request for access information for the mobile station from a database. In an embodiment, the request is sent to the paging controller. According to another embodiment, the request is sent to the home agent. In an example, the request is sent to both the paging agent and the home agent. According to an embodiment, the database is a par of the paging controller.

At step 506, the database sends the access information to the second foreign agent. In an embodiment, the database is a part of the paging controller. In another embodiment, the database is a part of the home agent.

At step 507, the second foreign agent receives the access information for the mobile station. Depending on the application, the access information includes may includes various types of information related to the connectivity of the mobile station. For example, the access information includes address and QoS information for the mobile station.

At step 508, the second foreign agent provides access to the mobile station. The mobile station connects to the second foreign agent to obtain wireless access. For example, the mobile station is associated with the second foreign agent in the idle mode.

At step 509, the database updates the access information. For example, the database, which may be a part of a proxy server and/or the paging controller, updates the access information for the mobile station so future communication are sent to mobile station are through the second foreign agent.

At step 510, second foreign agent send a signal indicating that the second foreign agent is providing access to the mobile station. Among other things, the signal allows other network entities to know that mobile station is now served by the second foreign agent. Depending on the application, other network entities may modify their resources allocated to the mobile station.

At step 511, the first foreign agent terminates wireless access for the mobile station if the signal is received. For example, by terminating the wireless access that is no longer need and/or redundant, valuable network resources are saved.

As explained above, the method described above is provided to illustrate an embodiment of the present invention, and steps are added, one or more steps are removed, or one or more steps are provided in a different sequence without departing from the scope of the claims herein.

Figure 6:
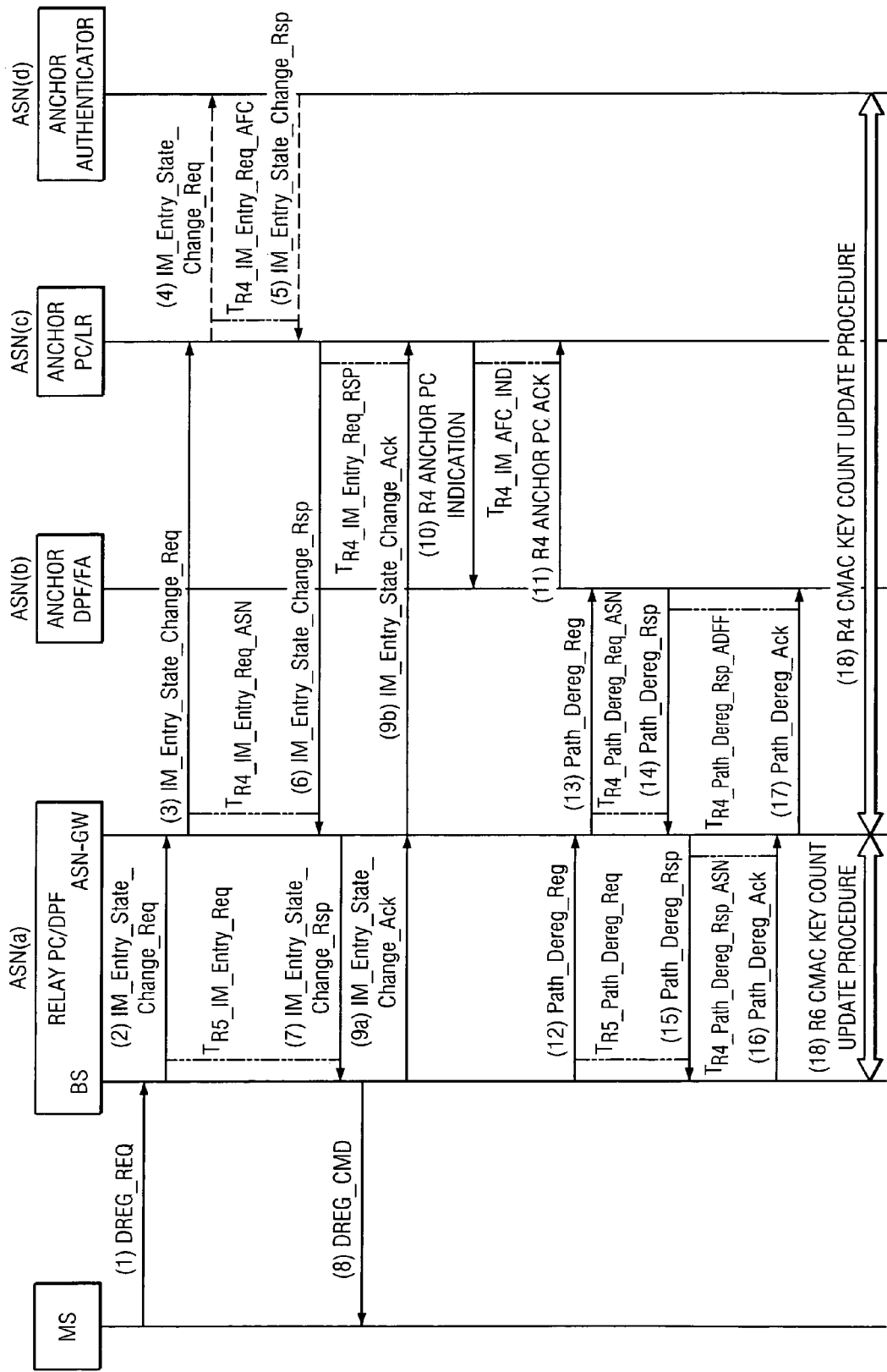
FIG. 6 is a simplified diagram illustrating a process for a mobile station to enter into a new access network according to an embodiment of the present invention.

FIG. 6 is a simplified diagram illustrating a process for a mobile station to enter into a new access network according to an embodiment of the present invention. This diagram is merely an example, which should not unduly limit the scope of the claims. One of ordinary skill in the art would recognize many variations, alternatives, and modifications.

As shown, the process includes the following steps:

STEP 1: The Serving BS(PA) decides to trigger MS entering Idle Mode, and sends R6 IM_Entry_State_Change_Req to the serving ASN-GW in ASN(a). The timer TR6_IM_Entry_Req is started by the BS(PA) to monitor the response message.

STEP 2: The Relay PC in ASN(a) associated with the Serving BS/PA will check the received message and recommends an Anchor PC and paging information for the MS. If the recommended Anchor PC is not itself, it forwards the message to the chosen Anchor PC as R4 IM_Entry_State_Change_Req. To help the Anchor PC to choose and confirm the paging parameters for the MS this message may include suggested parameters. Timer TR4_IM_Entry_Req_ASN is started in ASN(a) to monitor the R4 IM_Entry_State_Change_Rsp.

STEP 3: According to the reported info, the Anchor PC in ASN(c) will temporarily save current MS location information (BSID, Relay PC ID, PGID etc) and other parameters, and sends R4 IM_Entry_State_Change_Req message to the MS's Anchor authenticator to verify whether the MS is allowed to enter Idle mode. Timer TR4_IM_Entry_Req_APC is started to monitor the R4 IM_Entry_State_Change_Rsp from the Authenticator.

STEP 4: ASN(d) associated with Anchor Authenticator checks if the MS is allowed to enter Idle Mode and save necessary information if allowed, then sends back R4 IM_Entry_State_Change_Rsp to ASN(c) associated with Anchor PC/LR including MSID, Idle mode Authorization indication. If Idle mode entry is not allowed the Idle mode Authorization TLV will contain a rejection code. If the Authenticator fails to retrieve the security context or there is any other error with the message, the response message will contain an error code. Upon reception of this R4 IM Entry_MS_State_Change_Rsp message at Anchor PC, timer TIM_Entry_Req_APC is stopped.

STEP 5: ASN(c) associated with Anchor PC/LR forwards the R4 IM_Entry_State_Change_Rsp message to ASN(a) associated with the local Relay PC. Upon reception of this message at ASN(a), timer TR4_IM_Entry_Req_ASN is stopped.

STEP 6: Relay PC in ASN(a) forwards the message as R6 IM_Entry_State_Change_Rsp message to related Serving BS(PA). To wait for the acknowledgement to this message ASN(c) starts TR4-IM Entry Rsp_ASN. When the serving BS(PA) receives this message it stops the timer TR6_IM_Entry_Req.

STEP 7: The serving BS(PA) sends DREG_CMD to the MS as specified in IEEE 802.16e, asking it to enter Idle mode. The "PC ID" field in DREG_CMD will contain the Anchor PC for the MS as well as other paging parameters for the MS operation in Idle mode.

STEP 8: MS sends DREG_REQ to the BS(PA) as specified in IEEE 802.16e., acknowledging the Idle mode entry.

STEP 9: Upon reception of DREG_REQ from MS, the BS(PA) sends R6 IM_Entry_State_Change_Ack to Relay PC in ASN(a) to notify that the MS has successfully entered Idle Mode. (Note: Here in this call flow a success scenario of MS agreement to Idle mode entry is assumed.)

STEP 10: The Relay PC in ASN(a) forwards the message as R4 IM_Entry_State_Change_Ack to the Anchor PC in ASN(c) to indicate that the MS has successfully entered Idle mode and update the status. Upon reception of this message at ASN(c) timer TR4_IM_Entry_Rsp_APC is stopped.

STEP 11: ASN(c) associated with Anchor PC/LR will update the Idle mode information of MS into LR database and SHALL send R4 Anchor_PC_Ind message to ASN(b) associated with Anchor DPF/FA to confirm the success of MS entering Idle Mode. ASN(c) starts timer TR4_APC_Ind to monitor the response from ASN(b).

STEP 12: The ASN(b) associated with Anchor DPF/FA finally updates the information of MS including the Anchor PC ID of this MS and SHALL confirm the procedure by sending R4 Anchor_PC_Ack to the ASN(c). ASN(c) stops timer TR4_APC_Ind at the receipt of this Anchor PC Ack.

STEP 13: After the expiration of the Management Resource Holding Timer (an 802.16e parameter), BS initiates the related R6 data Path Dereg procedure. by sending R6 Path Dereg Req to the ASN-GW in serving ASN(a). After sending Path_Dereg_Req to the ASN(a) the BS starts timer TR6_Path_Dereg_Req to monitor the response.

STEP 14: ASN-GW in ASN(a) forwards the message as R4 Path Dereg Req to the ASN(b) associated with the Anchor DPF/FA. Timer TR4_Path_Dereg_Req_ASN is started in ASN-GW to monitor the response of this message.

STEP 15: ASN(b) completes the Path deregistration process for this MS and gives the response the message R4 Path Dereg Response to ASN(a). ASN-GW in ASN(a) stops the timer TR4_Path_Dereg_Req_ASN on receipt of this message.

STEP 16: ASN(a) forwards the message to the BS as R6 Path Dereg Response. Upon reception of this message TR6-Path Dereg Req is stopped. ASN-GW in ASN(a) starts timer TR4_Path_Dereg_Rsp_ASN to wait for the Path_Dereg_Ack message from the serving BS.

STEP 17: The BS completes the Data Path Dereg process for this MS and acknowledges it by sending R6 Path_Dereg_Ack to the ASN-GW in ASN(a). ASN-GW stops the timer TR4_Path_Dereg_Rsp_ASN upon receipt of this message.

STEP 18: ASN-GW in ASN(a) completes the data path deregistration from its side and send R4 Path_Dereg_Ack to ASN(b) associated with Anchor DPF/FA. Upon reception of this message ASN(b) stops timer TR4_Path_Dereg_Rsp_ADPF STEP 19: The BS(PA) updates the Anchor Authenticator with the CMAC Key count for the MS via the serving ASN as per the CMAC Key count update procedure in section 4.13. The Anchor Authenticator acknowledges the CMAC update for the MS. Optionally this procedure may be invoked anytime after step 12.

Depending upon the embodiment, the present invention includes various features, which may be used. These features include the following.

1. A procedure for FA relocation while MS is in idle mode in which the information can be obtained through location update procedure.
2. ASN GW paging control becomes a part of FA relocation process for the MS. The ASN GW is transparent and conducts relay function in Current text.
3. A mechanism is provided for FAs to obtain information through an anchor PC without using location update procedure.
4. The previous FA is notified after FA relocation occurs which triggers old FA to clean up the resource and other administrative control to the MS.

As shown, the above features may be in one or more of the embodiments of the invention. These features are merely examples, which should not unduly limit the scope of the claims herein. One of ordinary skill in the art would recognize many variations, modifications, and alternatives.

According to an embodiment, the present invention provides a system for providing wireless access. The system includes a service network that includes a database for storing information associated with providing network connection. The system also includes a first access network that is configured to provide a first wireless access in a first location. The system further includes a mobile station that is associated with the first access network, the mobile station being configured to send location update messages in an idle mode. The method also includes a second access network that is configured to provide access for the mobile station. The second access network is configured to provide a second wireless access in a second location. The system also includes a third access network that is configured to receive a first location update message from the mobile station in the idle mode. The third access network is configured to provide a third wireless access in a third location. The third access network determines whether to serve the mobile station in response to the first location update message. The third access network sends a request for access information of the mobile station if the third access network determines to serve to mobile station. The third access network sends a message indicating that the third access network is serving the mobile station. For example, the system is illustrated in FIGS. 4-6.

According to another embodiment, the present invention provides a method for providing access in a communication network. The method includes providing a first foreign agent that is configured to provide wireless access to mobile stations. The first foreign agent is associated with a first location. The method also includes providing network access to a mobile station by the first foreign agent. The mobile station is associated with a home agent, the mobile station being in an idle state. The method further includes receiving a location update request from the mobile station by a second foreign agent that is associated with a second location. Additionally, the method includes determining whether to provide an IP access to the mobile station by the second foreign agent. Furthermore, the method includes requesting by the second foreign agent access information for the mobile station from a database. The method also includes sending the access information from the database to the second foreign agent. Furthermore, the method includes receiving the access information for the mobile station by the second foreign agent. The method also includes providing access to the mobile station by the second foreign agent. In addition, the method includes updating the access information by the database. The method further includes sending a signal by the second foreign agent indicating that the second foreign agent is providing access to the mobile station. In addition, the method includes terminating the network access by the first foreign agent if the signal is received by the first foreign agent. For example, the system is illustrated in FIGS. 4-6.

According to yet another embodiment, the present invention provides a method for providing access in a communication network. The method includes providing a first foreign agent that is configured to provide wireless access to mobile stations. For example, the first foreign agent is associated with a first location. The method also includes providing network access to a mobile station by the first foreign agent, the mobile station being associated with a home agent. The mobile station is in an idle state. The method further includes receiving a location update request from the mobile station by a second foreign agent. The second foreign agent is associated with a second location. The method further includes determining whether to provide an IP access to the mobile station by the second foreign agent. The method further includes requesting by the second foreign agent access information for the mobile station from a database. In addition, the method includes receiving the access information for the mobile station by the second foreign agent. Also, the method includes providing access to the mobile station by the second foreign agent, the mobile being in the idle state. The method includes updating the access information by the database. Additionally, the method includes sending a signal by the second foreign agent indicating that the second foreign agent is providing access to the mobile station. The method also includes terminating the network access by the first foreign agent if the signal is received by the first foreign agent. Moreover, the method includes sending data to the mobile station through the second agent. For example, the system is illustrated in FIGS. 4-6.

Many benefits are achieved by way of the present invention over conventional techniques. For example, certain embodiments of the invention provide an FA relocation method that alleviates certain problems associated with conventional WIMAX solution discussed above. In some embodiments, FA relocation methods are provided that make FA relocation and Location update become more independent of each other. According to an embodiment, the old FA can be notified as soon as the MS which this FA managed is leaving to the new FA, so the network resource can be saved and prevent any administration problem if the old FA still keep the wrong information of the MS. Certain embodiments of the invention provide a mechanism for the FA to get sufficient information to initiate FA relocation while MS in idle mode without involving location update procedure. Additionally, the method provides a process that is clearer and simpler than conventional techniques t. Depending upon the embodiment, one or more of these benefits may be achieved.

It is also understood that the examples and embodiments described herein are for illustrative purposes only and that various modifications or changes in light thereof will be suggested to persons skilled in the art and are to be included within the spirit and purview of this application.

What is claimed is:

1. A system for providing wireless access, the system comprising:
    a first access network, the first access network including a database for storing information associated with providing network connection, the first access network being configured to provide a first wireless access in a first location;
    a connection network, the connection network being configured to provide an IP connection for mobile stations;
    a mobile station, the mobile station being associated with the connection network, the mobile station being configured to send location update messages in an idle mode;
    a second access network, the second access network being configured to provide access for the mobile station, the second access network being configured to provide a second wireless access in a second location; and
    a third access network, the third access network being configured to receive a location update message from the mobile station in the idle mode, the third access network being configured to provide a third wireless access in a third location;
    wherein:
        the third access network determines whether to serve the mobile station in response to the location update message;
        the third access network sends a location update request to the second access network for access information for the mobile station if the third access network determines to serve the mobile station;
        the second access network sends a location update response with associated information to the third access network upon receiving the location update request from the third access network; and
        the third access network sends a message to the second access network indicating that the third access network is serving the mobile station.

2. The system of claim 1 wherein the third access network initiates a relocation process if the third access network determines to serve the mobile station.

3. The system of claim 1 wherein the first access network terminates a network access for the mobile station based on a confirmation message.

4. The system of claim 1 wherein the third access network receives the access information for the mobile station.

5. The system of claim 1 wherein the first access network and the second access network perform resource cleanup in response to the message.

6. The system of claim 1 wherein the third access network sends the request for the access information using a location update procedure if the third access network determines to serve the mobile station.

7. The system of claim 1 wherein the third access network receives a second location update message.

8. The system of claim 1 further comprising a proxy mobile IP client.

9. The system of claim 1 wherein the connection network comprises a home agent.

10. The system of claim 1 wherein the second access network comprises a foreign agent.

11. The system of claim 1 wherein the first access network comprises a paging controller.

12. The system of claim 1 wherein the third access network comprises a relay paging controller, the relay paging controller being associated with a foreign agent.

13. The system of claim 1 wherein the access information is sent through a relay paging controller to the database.

14. A method for providing access in a communication network, the method comprising:
    providing a first foreign agent, the first foreign agent being configured to provide wireless access to mobile stations, the first foreign agent being associated with a first location;
    providing network access to a mobile station by the first foreign agent, the mobile station being associated with a home agent, the mobile station being in an idle state;

receiving a location update request from the mobile station by a second foreign agent through an access network, the second foreign agent being associated with a second location;

determining whether to provide an IP access to the mobile station by the second foreign agent;

requesting by the second foreign agent to the first foreign agent access information for the mobile station from a database;

sending by the first foreign agent the access information from the database to the second foreign agent;

receiving from the first foreign agent the access information for the mobile station by the second foreign agent;

providing access to the mobile station by the second foreign agent;

updating the access information by the database;

sending a signal by the second foreign agent to the first foreign agent indicating that the second foreign agent is providing access to the mobile station; and terminating the network access by the first foreign agent if the signal is received by the first foreign agent.

15. The method of claim 14 further comprising terminating the network access by a paging controller based on a confirmation signal.

16. The method of claim 14 wherein the requesting by the second foreign agent is a part of a location update procedure.

17. The method of claim 14 wherein the requesting by the second foreign agent is separate from a location update procedure.

18. The method of claim 14 wherein the determining whether to provide the IP access is based on a signal strength level.

19. The method of claim 14 wherein the determining whether to provide the IP access is based on a network traffic condition.

20. The method of claim 14 further comprising updating a connection status at a proxy network.

21. The method of claim 14 wherein the requesting by the second foreign agent comprises sending a request to a proxy mobile IP client.

22. The method of claim 14 wherein the requesting by the second foreign agent comprises sending a request to the database.

23. The method of claim 14 wherein the requesting by the second foreign agent comprises sending a request to the home agent.

24. The method of claim 14 wherein the communication network comprises a WiMAX network.

25. The method of claim 14 wherein the first foreign agent comprises a base station.

26. The method of claim 14 wherein the access information comprises IP connectivity information.

27. The method of claim 14 further comprising providing a paging controller, the paging controller including the database.

28. The method of claim 14 wherein the communication network comprises a relay paging controller that is associated with a foreign agent.

29. The system of claim 14 Wherein the access information is sent through a relay paging controller to the database.

30. The method of claim 14 wherein the first location and the second location are different.

31. The method of claim 14 wherein the signal is sent to the database.

32. The method of claim 14 wherein the signal is sent to the first foreign agent.

33. The method of claim 14 wherein the home agent comprises an access service network.

34. A method for providing access in a communication network, the method comprising:

providing a first foreign agent, the first foreign agent being configured to provide wireless access to mobile stations, the first foreign agent being associated with a first location;

providing network access to a mobile station by the first foreign agent, the mobile station being associated with a home agent, the mobile station being in an idle state;

receiving a location update request from the mobile station by a second foreign agent, the second foreign agent being associated with a second location;

determining whether to provide an IP access to the mobile station by the second foreign agent;

requesting by the second foreign agent to the first foreign agent access information for the mobile station from a database;

receiving from the first foreign agent the access information for the mobile station by the second foreign agent;

providing access to the mobile station by the second foreign agent, the mobile station being in the idle state;

updating the access information by the database;

sending a signal by the second foreign agent to the first foreign agent indicating, that the second foreign agent is providing access to the mobile station;

terminating the network access by the first foreign agent if the signal is received by the first foreign agent; and sending data to the mobile station through the second foreign agent.

* * * * *